United States Patent [19]
Rocklin

[11] Patent Number: 6,130,435
[45] Date of Patent: Oct. 10, 2000

[54] APPARATUS AND METHOD FOR MEASURING THE EFFECTIVENESS OF A SUNSCREEN COMPOSITION

[76] Inventor: Erik P. Rocklin, 896 N. Kingston St., Gilbert, Ariz. 85233

[21] Appl. No.: 09/045,248

[22] Filed: Mar. 20, 1998

[51] Int. Cl.[7] ................................... G01J 5/48
[52] U.S. Cl. ................................... 250/474.1
[58] Field of Search .......................... 250/474.1

[56] References Cited

U.S. PATENT DOCUMENTS

| | | | |
|---|---|---|---|
| 2,949,880 | 8/1960 | Fromer | 250/474.1 |
| 3,903,423 | 9/1975 | Zweig. | |
| 5,117,116 | 5/1992 | Bannard et al. | 250/474.1 |
| 5,411,835 | 5/1995 | Brinser. | |
| 5,581,090 | 12/1996 | Goudjil. | |
| 5,914,197 | 6/1999 | Goudjil | 428/537.5 |
| 5,986,273 | 11/1999 | Tripp et al. | 250/474.1 |

*Primary Examiner*—Constantine Hannaher
*Attorney, Agent, or Firm*—Parsons & Goltry; Michael W. Goltry; Robert A. Parsons

[57] ABSTRACT

An apparatus for measuring the effectiveness of a sunscreen composition applied to protect an epidermis from harmful exposure to ultraviolet light, the epidermis having a texture and an absorbent character, the apparatus comprising an ultraviolet light-sensitive layer for changing color when exposed to ultraviolet light, the layer receivable adjacent the epidermis and having a texture and an absorbent character substantially similar to the texture and absorbent character of the epidermis.

4 Claims, 2 Drawing Sheets

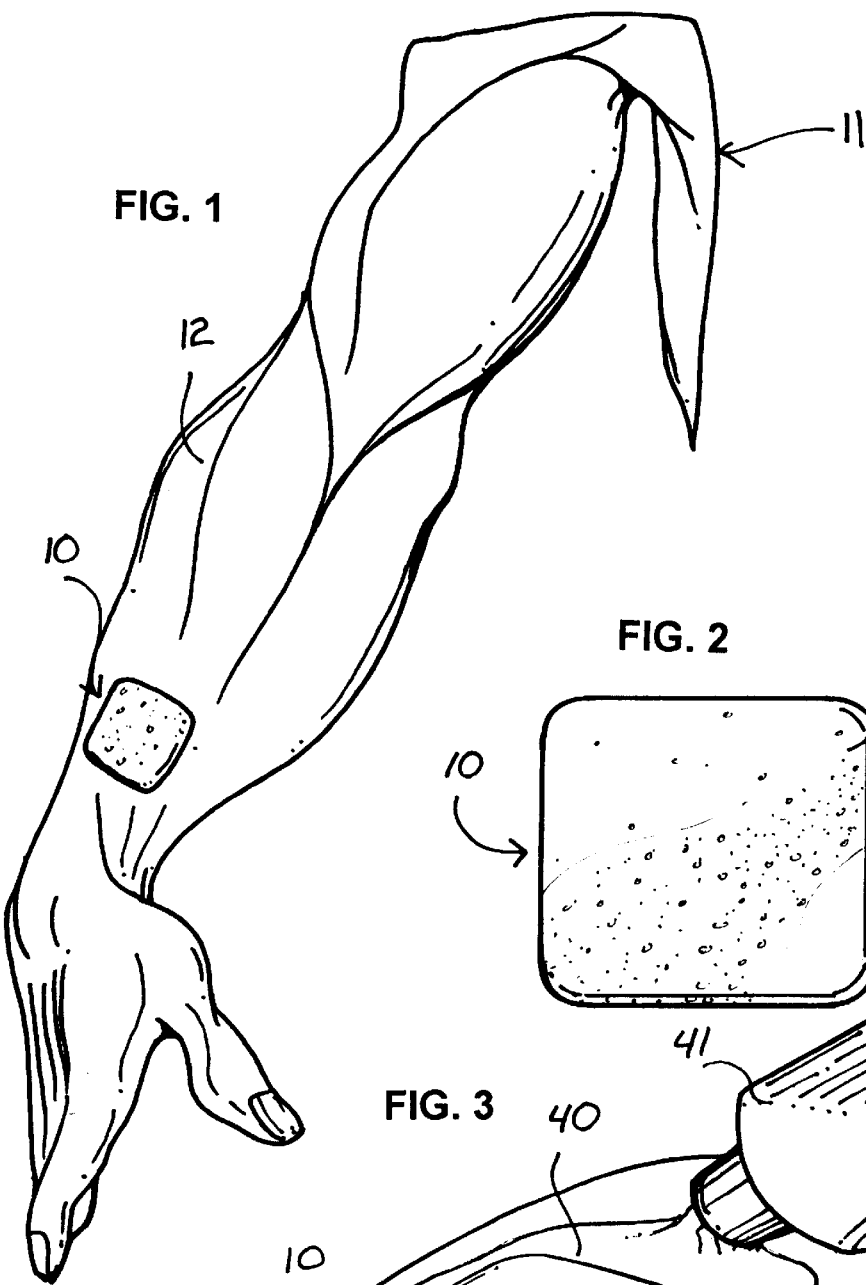
FIG. 1
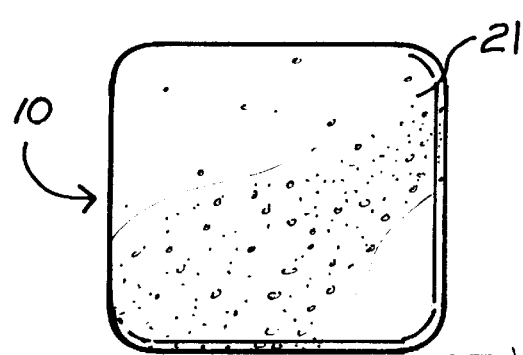
FIG. 2
FIG. 3
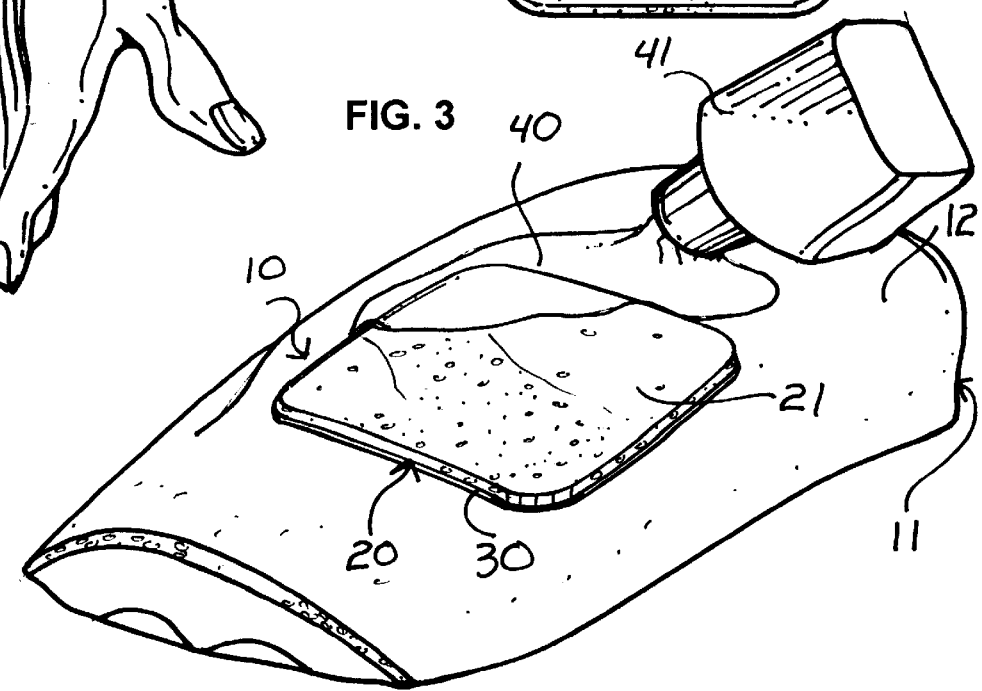

APPARATUS AND METHOD FOR MEASURING THE EFFECTIVENESS OF A SUNSCREEN COMPOSITION

FIELD OF THE INVENTION

This invention relates generally to the field of ultraviolet light detectors and, more particularly, to an apparatus for, and a method of, measuring the effectiveness of a sunscreen composition applied to protect the human body from harmful exposure to ultraviolet light.

BACKGROUND OF THE INVENTION

Exposure of the human body to ultraviolet light, whether provided naturally from the sun or artificially, has proven to cause damage to the human body, particularly to the skin of the human body. To protect human skin from damage that may otherwise occur from exposure to ultraviolet light, the prior art is replete with various forms of sunscreen or sun-block compositions that may be applied to the human body to coat and protect the skin from harmful exposure to ultraviolet light.

Although exemplary, the prior art sunscreen compositions wear off of the skin after a predetermined period of time due to exposure with water during swimming and other physical activities thus becoming ineffective for protecting the skin from harmful exposure to ultraviolet light. After wearing off, users frequently forget to apply additional sunscreen to their skin thus resulting in, for instance, painful sunburn damage to the skin.

Accordingly, it would be highly desirable to provide an improved apparatus for, and a method of, measuring the effectiveness of a sunscreen composition applied to protect the human body from harmful exposure to ultraviolet light.

It is another purpose of the present invention to provide a new and improved apparatus that is easy to use.

It is still another purpose of the present invention to provide a new and improved apparatus that is inexpensive.

It is yet another purpose of the present invention to provide a new and improved apparatus that is easy to construct.

It is a further purpose of the present invention to provide a new and improved apparatus that is highly efficient for measuring the effectiveness of a sunscreen composition applied to protect the human body from harmful exposure to ultraviolet light.

SUMMARY OF THE INVENTION

The above problems and others are at least partially solved and the above purposes and others are realized in an apparatus for measuring the effectiveness of a sunscreen composition applied to protect an epidermis from harmful exposure to ultraviolet light, the epidermis having a texture and an absorbent character. The apparatus is generally comprised of an ultraviolet light-sensitive layer for changing color when exposed to ultraviolet light, the layer receivable adjacent the epidermis and having a texture and an absorbent character substantially similar to the texture and absorbent character of the epidermis.

To engage the layer with or otherwise adjacent the external covering or epidermis of the skin, the apparatus may further include a base for supporting the layer and an engagement mechanism carried by the base for engagement with the epidermis. The engagement mechanism may include an adhesive backing or a suitable mechanical engagement assembly for facilitating wrapping engagement of the base with a user adjacent the epidermis.

The present invention further provides a method of protecting an epidermis from harmful exposure to ultraviolet light, the epidermis having a texture and an absorbent character. The method is generally comprised of the steps of providing an ultraviolet light-sensitive layer for changing color when exposed to ultraviolet light, the layer having a texture and an absorbent character substantially similar to the texture and absorbent character of an epidermis, coupling the layer adjacent the epidermis, coating the epidermis and the layer with a sunscreen composition, and re-coating the epidermis and the layer with the sunscreen composition when the layer changes color.

BRIEF DESCRIPTION OF THE DRAWINGS

The foregoing and further and more specific objects and advantages of the instant invention will become readily apparent to those skilled in the art from the following detailed description thereof taken in conjunction with the drawings in which:

FIG. 1 illustrates an apparatus shown as it would appear worn by a user for measuring the effectiveness of a sunscreen composition applied to protect an epidermis of the user from harmful exposure to ultraviolet light, in accordance with the present invention;

FIG. 2 illustrates a top plan view of the apparatus of FIG. 1;

FIG. 3 illustrates a the apparatus of FIG. 1 shown as it would appear worn by a user with a sunscreen composition shown being applied to the epidermis of the user to protect the epidermis from harmful exposure to ultraviolet light, and to the apparatus;

DETAILED DESCRIPTION OF PREFERRED EMBODIMENTS

Figure 4:
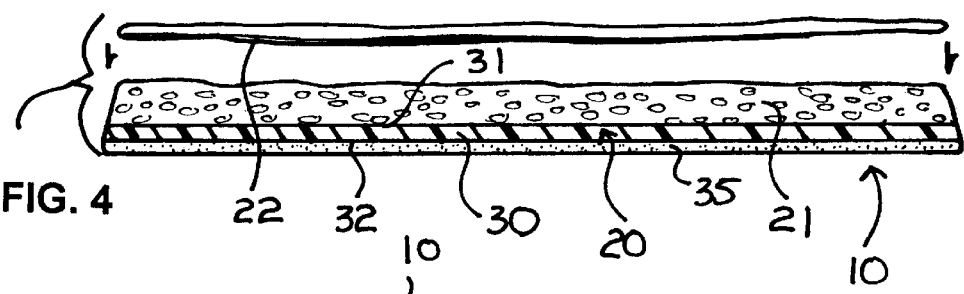
FIG. 4 illustrates a partially exploded vertical sectional view of the apparatus first shown in combination with FIG. 1.

The present invention provides, among other things, an apparatus for, and a method of, measuring the effectiveness of a sunscreen composition applied to protect an epidermis of a human body from harmful exposure to ultraviolet light that may otherwise cause, at the least, burning of the epidermis. The present invention is easy to construct and is particularly adapted to experience and respond to physical stresses substantially like that of the epidermis. In this regard, the present invention provides the unique function of measuring the effectiveness or worth of sunscreen as applied to the epidermis. It will be generally understood that the epidermis of the human body includes a texture and an absorbent character.

For the purposes of the present disclosure, the phrase "harmful exposure to ultraviolet light" is herein defined as exposure of the epidermis to ultraviolet light wherein an amount of sunscreen or sun-block applied to the epidermis is of a quality or quantity insufficient to protect the epidermis from burning or otherwise suffering damage when exposed to ultraviolet light.

Turning now to the drawings, FIG. 1 illustrates an apparatus 10 shown as it would appear worn by a user 11 for measuring the effectiveness of a sunscreen composition applied to protect the skin, and more particularly the external covering or epidermis 12 of the skin, of user 11 from harmful exposure to ultraviolet light, in accordance with the present invention. Regarding FIGS. 4 and 5, apparatus 10 is provided generally in the form of a patch and is generally comprised of a base 20, a layer 21 (shown also in FIG. 2 illustrating a top plan view of apparatus 10) and an ultraviolet light-sensitive or photochromic composition 22.

Base 20 includes body 30 constructed, in this specific example, of a substantially flexible material such as plastic or the like, body 30 having first and second opposing major surfaces 31 and 33. Carried or otherwise affixed with first major surface 31, such as by a suitable adhesive or other similar engagement mechanism, is layer 21. Shown as preferably but not essentially substantially coextensive with first major surface 31, layer 21 is suitably constructed of a selected skin-like material characteristically similar to the skin of the human body and, more particularly, to the epidermis 12 of the human body. In this regard, layer 21 is preferably constructed of a selected latex or other synthetic skin-like material, lambskin or other selected material having substantially the same texture and absorbent character as the epidermis 12 of the human body.

Carried by or otherwise impregnated into layer 21 is ultraviolet light-sensitive or photochromic composition 22, shown in FIG. 4 as spaced from layer 21 for the purposes of illustration. Composition 22 is of a type that changes color when exposed to ultraviolet light, the specific details of which will not be herein specifically addressed as such photochromic compositions are well known in the art.

Figure 5:
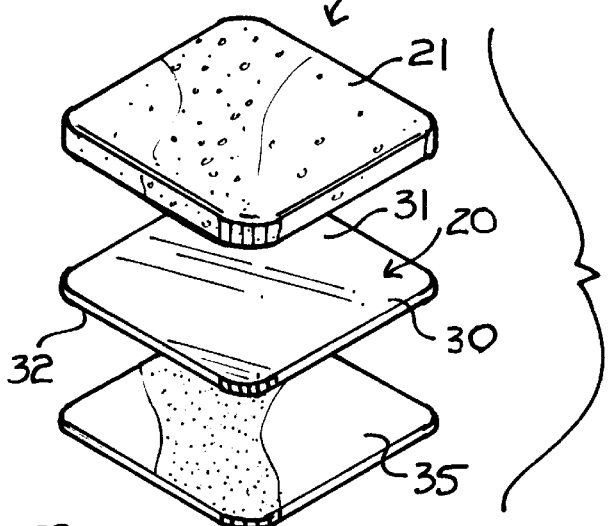
FIG. 5 illustrates an exploded perspective view of the apparatus of FIG. 1.

In operation, apparatus 10 may be engaged with portions of the epidermis 12 of user 11 and used to measure the effectiveness of a selected sunscreen composition applied to prevent epidermis 12 from harmful exposure to ultraviolet light that may cause, for instance, painful burning. In this regard, apparatus 10 is designed for engagement with or adjacent epidermis 12. To this end, and as shown in FIGS. 4 and 5, second major surface 32 may include an adhesive layer or backing 35 suitable for adhesive engagement with epidermis 12 of user 11 as shown substantially in FIGS. 1 and 3.

So engaged with epidermis 12 as shown, layer 21 is exposed so as to be subject to the same physical stresses as exposed portions of the epidermis 12 of user 11. Regarding FIG. 3, a selected and conventional sunscreen or sun-block composition 40 may be applied to epidermis 12 and to layer 21 in an amount sufficient to protect epidermis 12 and layer 21 from harmful exposure to ultraviolet light. So covered with sunscreen composition 40, layer 21 will be protected from harmful exposure to ultraviolet light which may otherwise cause composition 22 to change color. Sunscreen composition 40 may be provided as a viscous mass in the form of a spreadable lotion carried by a dispense container 41 as shown, a sprayable lotion, or other selected viscous mass that a user may apply and disperse, such as by rubbing, to form a coating upon epidermis 12. So coated, sunscreen composition 40 will not only operate to protect layer 21 from harmful exposure to ultraviolet light to correspondingly protect composition 22 from changing color, but will also operate to protect exposed portions of epidermis 12 from harmful exposure to ultraviolet light.

Because layer 21 is constructed of a material substantially similar in texture and absorbent character as epidermis 12, the effectiveness of sunscreen composition 40 for protecting layer 21 to inhibit composition 22 from changing color will replicate substantially the effectiveness of sunscreen composition 40 to protect exposed portions of epidermis 12 from harmful or damaging exposure to ultraviolet light. In this regard, as user 11 engages in activities such as swimming, water-skiing, water-polo, sailing, kayaking, skiing, jogging, golfing biking and other outdoor physical activities, the sunscreen composition 40 located on epidermis 12 will be subjected to a variety of physical stresses that can cause it to wear off of epidermis 12. As sunscreen composition wears off of epidermis 12, it can become ineffective for protecting epidermis 12 from harmful exposure to ultraviolet light. With apparatus 10 mounted with or otherwise adjacent epidermis 12, the sunscreen composition 40 located thereon will also be subject to same physical stresses as the sunscreen composition 40 located on epidermis 12. As a result, the wear of sunscreen composition 40 on layer 21 will be substantially similar to, or will otherwise occur at substantially the same rate as, the wear of sunscreen composition 40 on epidermis 12.

Thus, as sunscreen composition 40 wears from layer 21 to a point where it becomes ineffective for protecting composition 22 from changing color or otherwise ineffective for protecting layer 21 from harmful exposure to ultraviolet light, composition 22 will then change color. At this point, the sunscreen composition 40 also will have worn away to a point where it may be ineffective for protecting epidermis 12 from harmful exposure to ultraviolet light. Upon observance by the user of the color change of composition 22 carried by layer 21, the user may then reapply the sunscreen-composition 40 to his or her epidermis 12 and layer 21 to again protect epidermis 12 from harmful exposure to ultraviolet light and to protect layer 21 from harmful exposure to ultraviolet light to protect composition 22 from changing color.

Consistent with the foregoing, the phrase "harmful exposure to ultraviolet light" as relating to layer 21 is herein defined as exposure of layer 21 to ultraviolet light wherein an amount of sunscreen or sun-block applied to layer 21 is of a quality or quantity insufficient to protect composition 22 carried by layer 21 from changing color when exposed to ultraviolet light.

Figure 6:
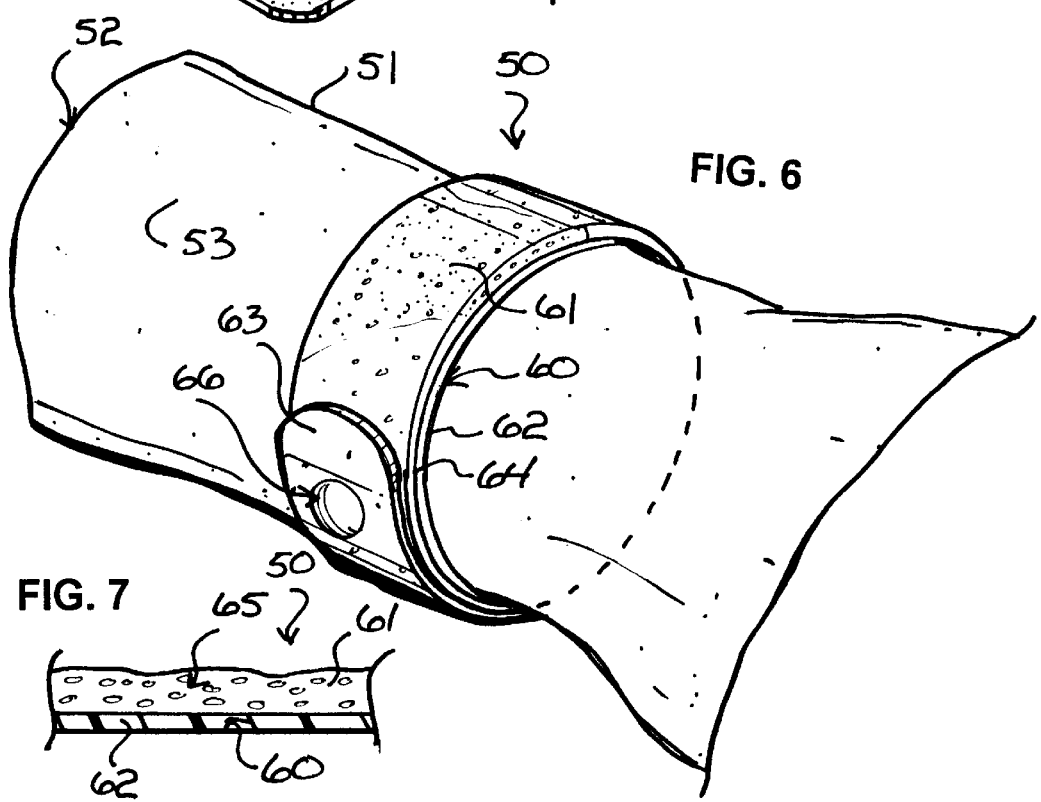
FIG. 6 illustrates an apparatus shown as it would appear worn by a user for measuring the effectiveness of a sunscreen composition applied to protect an epidermis of the user from harmful exposure to ultraviolet light, in accordance with another embodiment of the present invention.

Rather than a patch, the present invention may be provided in other forms suitable for a user to wear with or otherwise adjacent his or her epidermis. In this regard, attention is now directed to FIG. 6 illustrating an apparatus 50 provided in the form of a band shown as it would appear wrapped about the wrist of an arm 51 of a user 52. Like apparatus 10, apparatus 50 is operative for measuring the effectiveness of a sunscreen composition applied to protect epidermis 53 of user 52 from harmful exposure to ultraviolet light.

Figure 7:
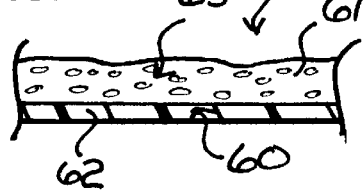
FIG. 7 illustrates a vertical sectional view of the apparatus of FIG. 6.

Having substantially the same structural and functional characteristics as apparatus 10, and with additional reference to FIG. 7 illustrating a vertical section view of apparatus 50, apparatus 50 is generally comprised of a base 60 and a layer 61 carried by base 60. Base 60 includes an elongate body 62 constructed, in this specific example, of a substantially flexible material such as plastic or the like, elongate body 62 having first and second opposing free ends 63 and 64 as shown only in FIG. 7. Like layer 21, layer 61 is suitably constructed of a selected skin-like material characteristically similar in texture and absorbent character to the epidermis of the human body. In this regard, layer 61 is preferably constructed of a selected latex material or other synthetic skin-like material, lambskin or other selected material having substantially the same texture and absorbent character as the epidermis of the human body. Carried by or otherwise impregnated into layer 61 is an ultraviolet light-sensitive or photochromic composition being generally designated at 65 and being substantially similar in function to composition 22 discussed with apparatus 10.

Carried by ends 63 and 64 is an engagement assembly 66 operative for detachably engaging ends 63 and 64 together. In this regard, and with base 60 facing the epidermis 53 of user 52, apparatus 50 may be flexed for wrapping about portions of user 52, such as the wrist as shown in FIG. 6, and ends 63 and 64 engaged together to provide detachable engagement of ends 63 and 64 via engagement assembly 66. So engaged, layer 61 will be exposed so as to be subject to the same physical stresses as exposed portions of the epidermis 53 of user 52. Engagement assembly 66 may be provided in the form of a hook and loop engagement assembly commonly provided under the exemplary trademark VELCRO, complemental snaps or other suitable mechanism operative for providing the desired detachable engagement of ends 63 and 64.

So installed with user 53 as shown substantially in FIG. 6, a selected or conventional sunscreen or sun-block composition may be applied to epidermis 53 and to layer 61 as desired as if layer 61 was a part of epidermis 53. In this regard, the sunscreen composition may be reapplied as necessary to epidermis 53 and layer 61 when the sunscreen wears away from layer 61 to a degree sufficient to cause composition 65 to change color as a result of harmful exposure of composition 65 with ultraviolet light.

In summary, the present invention provides an exemplary apparatus for, and method of, measuring the effectiveness of a sunscreen composition applied to protect an epidermis of the human body from harmful exposure to ultraviolet light, and a method of protecting the human body from harmful exposure to ultraviolet light. The preferred embodiments of the present invention herein disclosed experience and respond to physical stresses much like that of the human skin, thus providing an effective measure of the effectiveness or worth of sunscreen for protecting human skin from damaging or harmful exposure to ultraviolet light.

The present invention has been described above with reference to a preferred embodiment. However, those skilled in the art will recognize that changes and modifications may be made in the described embodiments without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A method of protecting an epidermis from harmful exposure to ultraviolet light, the epidermis having a texture and an absorbent character, the method comprising the steps of:

providing a base supporting an ultraviolet light-sensitive layer that changes color when exposed to ultraviolet light, the layer having a texture and an absorbent character substantially similar to the texture and absorbent character of an epidermis;

mounting the base about and adjacent the epidermis in a wrapped condition;

coating the epidermis and the layer with a sunscreen composition; and re-coating the epidermis and the layer with the sunscreen composition when the layer changes color.

2. The method of claim 1, further including the step of providing the base with an engagement assembly for providing a wrapping engagement of the base about and adjacent the epidermis.

3. Apparatus for measuring the effectiveness of a sunscreen composition applied to protect an epidermis from harmful exposure to ultraviolet light, the epidermis having a texture and an absorbent character, the apparatus comprising:

a base supporting an ultraviolet light-sensitive material that changes color when exposed to ultraviolet light, the layer having a texture and an absorbent character substantially similar to the texture and absorbent character of an epidermis; and an engagement assembly for engaging the base about and adjacent the epidermis in a wrapped condition.

4. A method of protecting an epidermis from harmful exposure to ultraviolet light, the epidermis having a texture and an absorbent character, the method comprising the steps of:

providing a base having a first major surface supporting adhesive and a second major surface supporting an ultraviolet light-sensitive layer that changes color when exposed to ultraviolet light, the layer having a texture and an absorbent character substantially similar to the texture and absorbent character of an epidermis;

engaging the adhesive to one of to the epidermis and adjacent the epidermis;

coating the epidermis and the layer with a sunscreen composition; and re-coating the epidermis and the layer with the sunscreen composition when the layer changes color.

* * * * *